United States Patent [19]
Plavcan et al.

[11] Patent Number: 6,079,865
[45] Date of Patent: Jun. 27, 2000

[54] ELECTRIC MIXER

[75] Inventors: Daniel J. Plavcan, Stratford, Conn.; Paul Holbrook, Buffalo Grove, Ill.; Robert A. St. John, Cheshire, Conn.

[73] Assignee: HP Intellectual Corp., Wilmington, Del.

[21] Appl. No.: 09/058,248

[22] Filed: Apr. 10, 1998

[51] Int. Cl.$^7$ .......................... H01L 15/00; H01L 15/06; H01L 9/06; B01F 7/16
[52] U.S. Cl. .......................... 366/129; 366/601; 200/16 R; 200/550; 200/551; 200/61.85
[58] Field of Search .................... 366/129, 197, 366/199, 206, 245, 246, 249, 251, 297, 300, 301, 331, 344, 601; 200/16 R, 547, 548, 549, 550, 551, 61.85, 332.2, 293.1; 338/176, 198

[56] References Cited

U.S. PATENT DOCUMENTS

| | | | |
|---|---|---|---|
| 2,279,753 | 4/1942 | Knopp | 200/4 |
| 2,329,640 | 9/1943 | Moeller . | |
| 2,616,732 | 11/1952 | Schwaneke . | |
| 2,987,626 | 6/1961 | Jepson | 310/50 |
| 3,456,229 | 7/1969 | Matthews | 338/198 |
| 3,821,902 | 7/1974 | DuBois et al. . | |
| 3,951,351 | 4/1976 | Ernster et al. . | |
| 4,176,971 | 12/1979 | Ernster et al. . | |
| 4,238,755 | 12/1980 | Knauff . | |
| 4,324,958 | 4/1982 | Valleau . | |
| 4,507,006 | 3/1985 | Golob et al. . | |
| 4,592,144 | 6/1986 | Tolbert et al. . | |
| 4,620,796 | 11/1986 | Moores . | |
| 5,533,801 | 7/1996 | Safont et al. . | |
| 5,869,954 | 2/1999 | Kurz | 323/237 |

FOREIGN PATENT DOCUMENTS 0678269  10/1995  European Pat. Off. .

*Primary Examiner*—W. L. Walker
*Assistant Examiner*—Terry K. Cecil
*Attorney, Agent, or Firm*—Barry E. Deutsch

[57] ABSTRACT

A hand mixer 30 is formed with a housing 32 and a handle 34 extending in one direction from the housing. A pair of beaters 58 and 60 can be assembled with the hand mixer 30 and rotated by a motor 88 under the control of a sensory actuator 92. A slidable compliant switch pad 44 provides an external facility for an operator to selectively position the sensory actuator 92 to operate the motor 88, and the beaters 58 and 60, at the different speeds. The sensory actuator 92 provides a tactile response to the operator during selection of the different speeds. The hand mixer 30 is provided with a first embodiment of a beater ejection mechanism 192, or a second embodiment of a beater ejection mechanism 242, for facilitating ejection of the beaters 58 and 60 from the hand mixer. A button 52 located externally on top of the housing 32 provides operational access to the operator to initiate the beater ejection process.

4 Claims, 12 Drawing Sheets

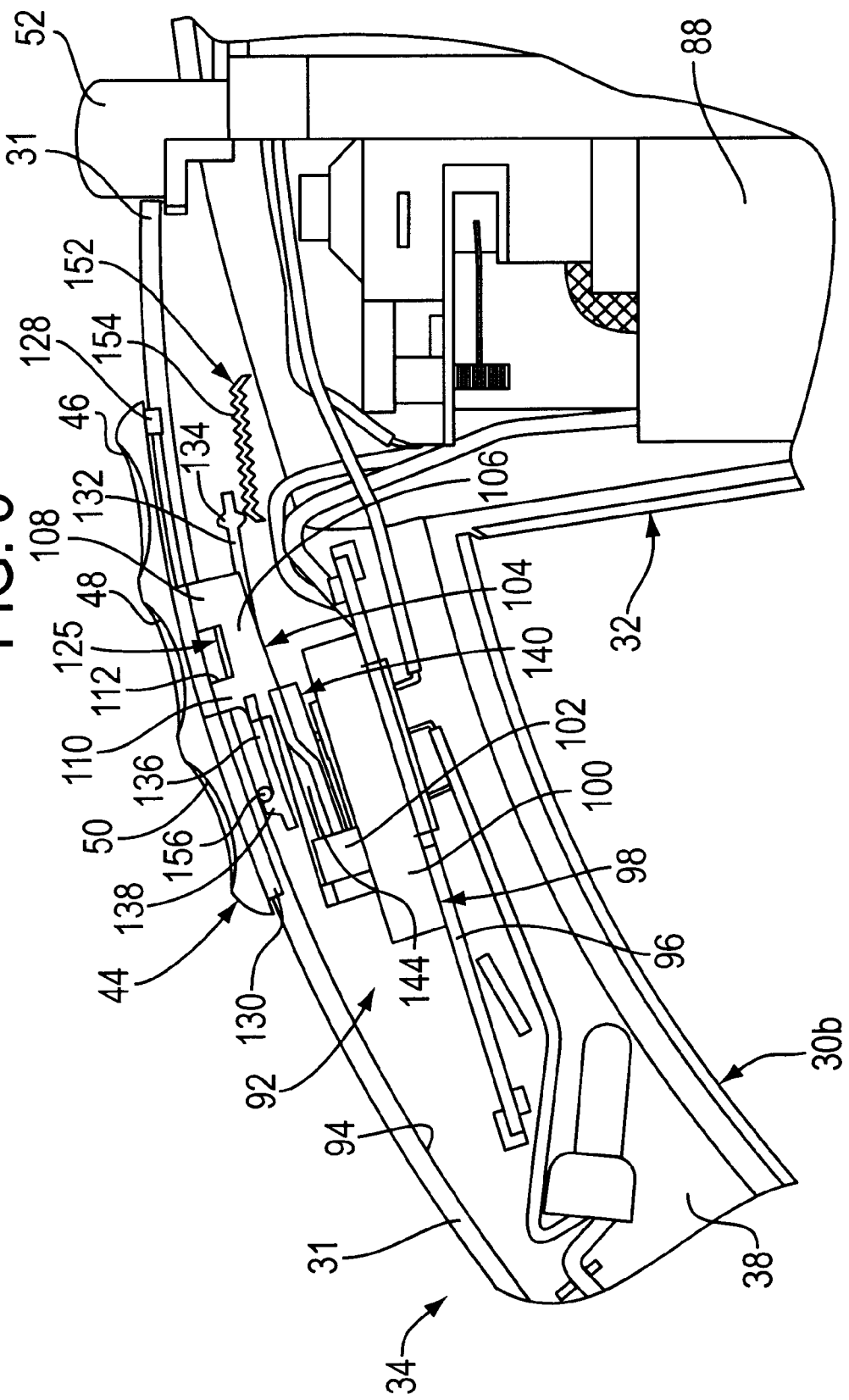

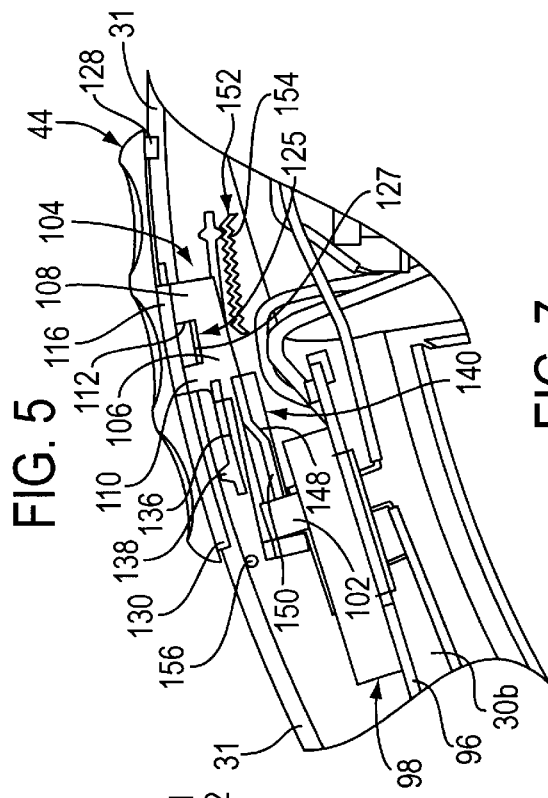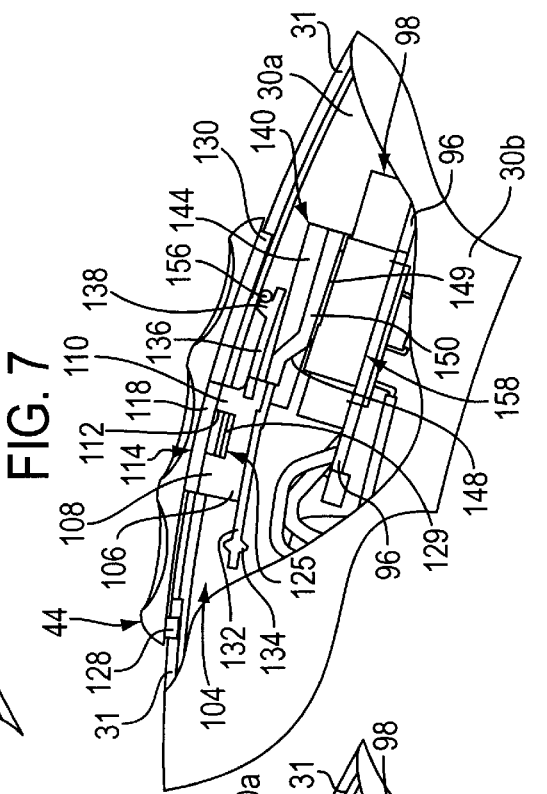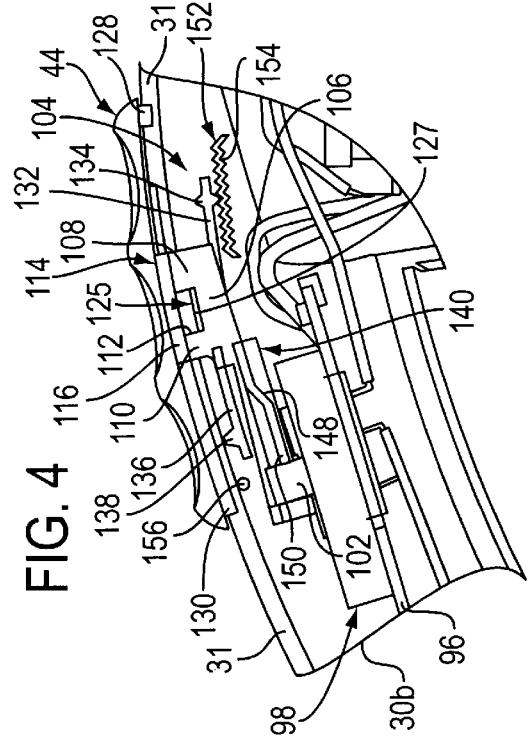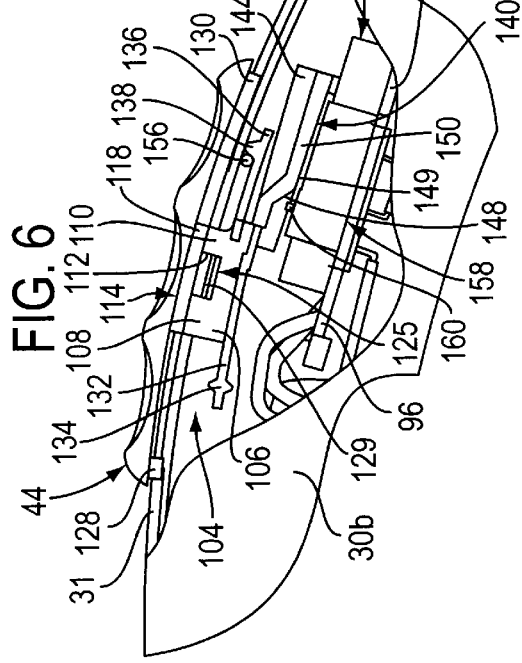

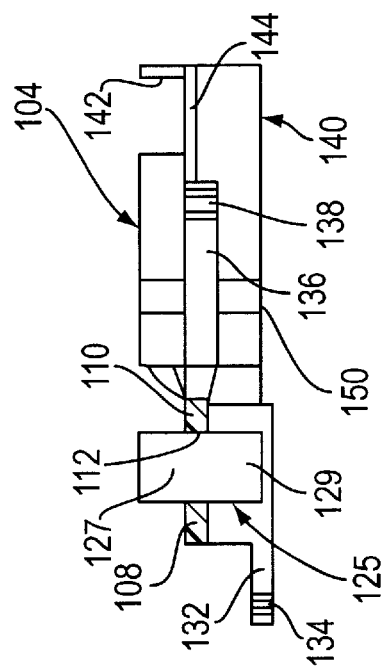
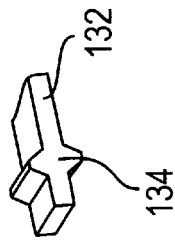
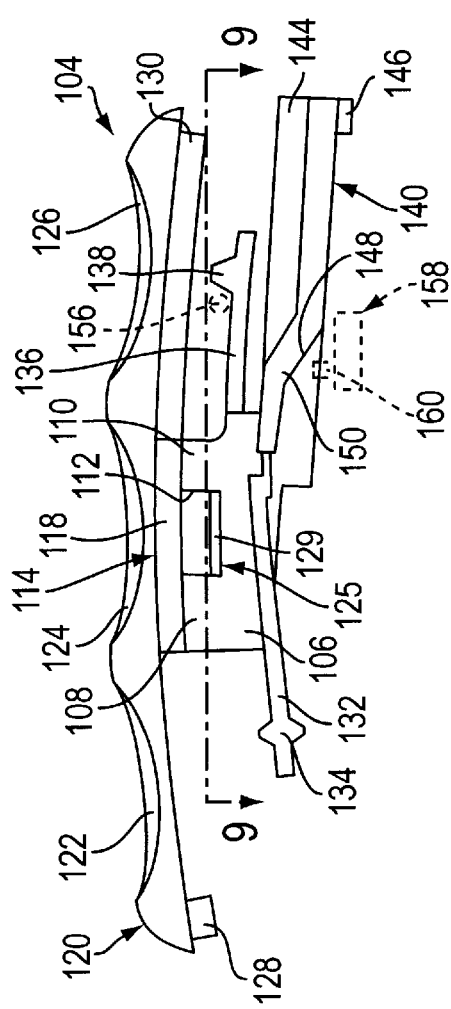
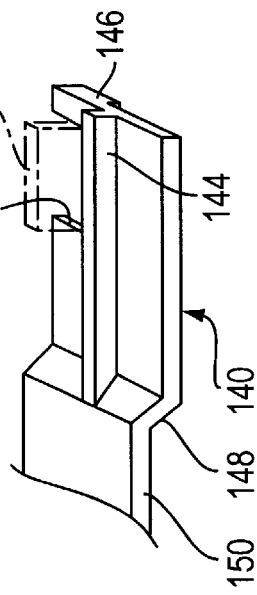

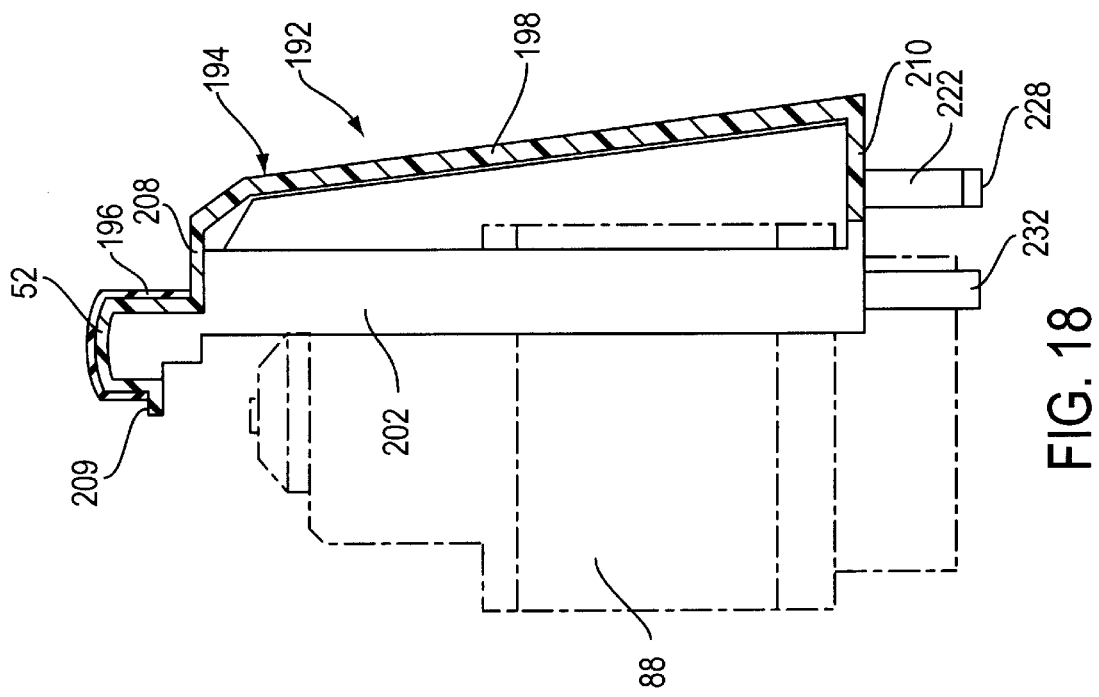
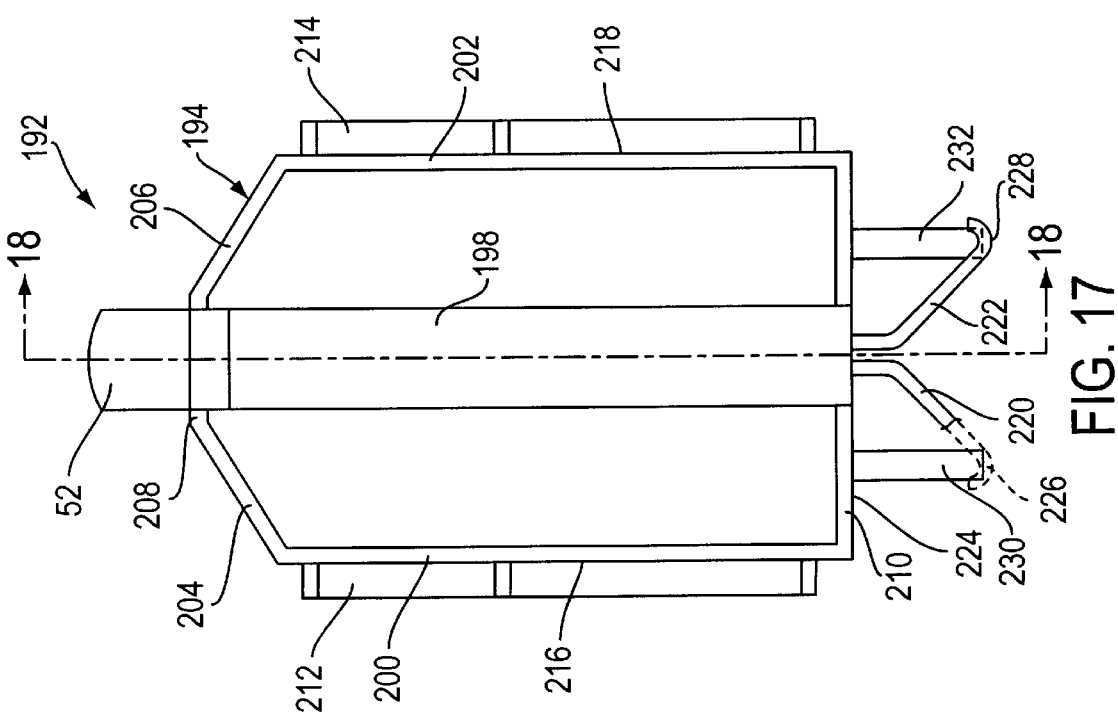

ELECTRIC MIXER

BACKGROUND OF THE INVENTION

This invention relates to an electric mixer and particularly relates to a hand-held electric mixer for processing a variety of food items.

At least two general types of electric food-processing mixers are available in today's marketplace. A first type is a stand-alone electric mixer, which is frequently referred to as a stand mixer, and which includes a bowl, mixing beaters and a driving mechanism supported on a single structure. A second type is a hand-held electric mixer, frequently referred to as a hand mixer, which includes a mobile housing for supporting mixing beaters, a drive mechanism and a handle.

The stand mixer is typically situated on a table or a counter top and, for the most part, may be operated in situ during a mixing and beating mode without being supported by the user. The hand mixer, on the other hand, is typically held by the user who provides the support therefor, during at least a mixing and beating mode, and also provides the movement and motion for an efficient mixing and beating operation.

With a stand mixer, the user can concentrate on such matters as speed control, mixing action and beater ejection without concern for support and manipulation of the mixer which is, in effect, self supporting. With the hand mixer, the user must concentrate on supporting and manipulating the mixer while attending to adjusting the speed of the beaters, and the eventual ejection of the beaters.

Thus, in the use of the hand mixer, there is a need for a convenient and efficient manner of adjusting the speed of the beaters during a mixing and beating operation, and for easily ejecting the beaters following the mixing and beating operation, while maintaining full support of the mixer.

SUMMARY OF THE INVENTION

Therefore, it is an object of this invention to provide an electric hand mixer which can be supported by the user thereof while allowing the user to easily adjust the speed of the beaters thereof during operation of the beaters.

Another object of this invention is to provide an electric mixer which can be supported by the user thereof while easily facilitating the ejection of the beaters therefrom.

With these and other objects in mind, this invention contemplates an electric mixer which includes a housing and a handle formed with and extending from the housing for handling of the electric mixer by an operator, with the housing and the handle forming a hollow shell therewithin. A beater holder is mounted in the hollow shell for supporting at least one beater implement and a motor is contained within the hollow shell for rotating the beater holder. An adjustable speed control assembly is mounted within the hollow shell for selectively controlling the speed of operation of the motor and thereby the rotational speed of the beater holder. A tactile control mechanism is located within the hollow shell to provide tactile response to the operator of the selective operation and control of the mixer during any mixing and beating operation.

This invention further contemplates an electric hand mixer which includes a housing having a handle formed therewith. The handle provides facility for the gripping thereof by an operator while the operator supports the mixer during a mixing and beating operation. At least one beater is mounted in the housing and is drivable by a drive mechanism contained within the housing. A beater retention mechanism within the housing removably retains the beater with the housing. A beater release mechanism is located within the housing and is operable by the user from an exterior location of the housing adjacent the gripping facility of the handle. Upon selective actuation by the operator, the beater release mechanism manipulates the retention mechanism to release the beater from the retention mechanism.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 3 is a side view of a handle of the hand mixer of FIG. 1 with a side of the handle removed showing a sensory actuator including a switch sensory mechanism in accordance with certain principles of the invention, with a switch associated therewith being in the "off" position;

FIG. 4 is a partial side view of the handle of FIG. 3 showing the switch sensory mechanism and a speed sensory mechanism of the sensory actuator in accordance with certain principles of the invention, with the switch being in the "on" position and the speed sensory mechanism being in an intermediate speed position;

FIG. 5 is a partial side view of the handle of FIG. 3 showing the switch sensory mechanism and the speed sensory mechanism in accordance with certain principles of the invention, with the switch being in the "on" position and the speed sensory mechanism being in a maximum speed position;

FIG. 6 is a partial side view of the handle, as viewed from the side of the handle opposite to the side shown in FIGS. 3, 4 and 5 showing the switch sensory mechanism in the "off" position in accordance with certain principles of the invention;

FIG. 7 is a partial side view of the handle of FIG. 6 showing the switch sensory mechanism in the "on" position in accordance with certain principles of the invention;

FIG. 8 is a side view showing features of a sensory device which forms major portions of the switch sensory mechanism and the speed sensory mechanism in accordance with certain principles of the invention;

FIG. 9 is a top view of the sensory device of FIG. 8, with portions thereof in sectional view, showing structural features of the device in accordance with certain principles of the invention;

FIG. 10 is a perspective view of a portion of the sensory device of FIG. 8 showing structural features of the device in accordance with certain principles of the invention;

FIG. 11 is a perspective view of a portion of the speed sensory mechanism of FIG. 4 showing a free end of a cantilevered beam in accordance with certain principles of the invention;

FIG. 17 is a front view of the first embodiment of the beater ejection mechanism of FIG. 15 in accordance with certain principles of the invention;

FIG. 18 is a sectional view taken along line 18—18 of FIG. 17 showing a side of the first embodiment of the beater ejection mechanism of FIG. 15 in accordance with certain principles of the invention;

DESCRIPTION OF THE PREFERRED
EMBODIMENT OF THE INVENTION

Figure 1:
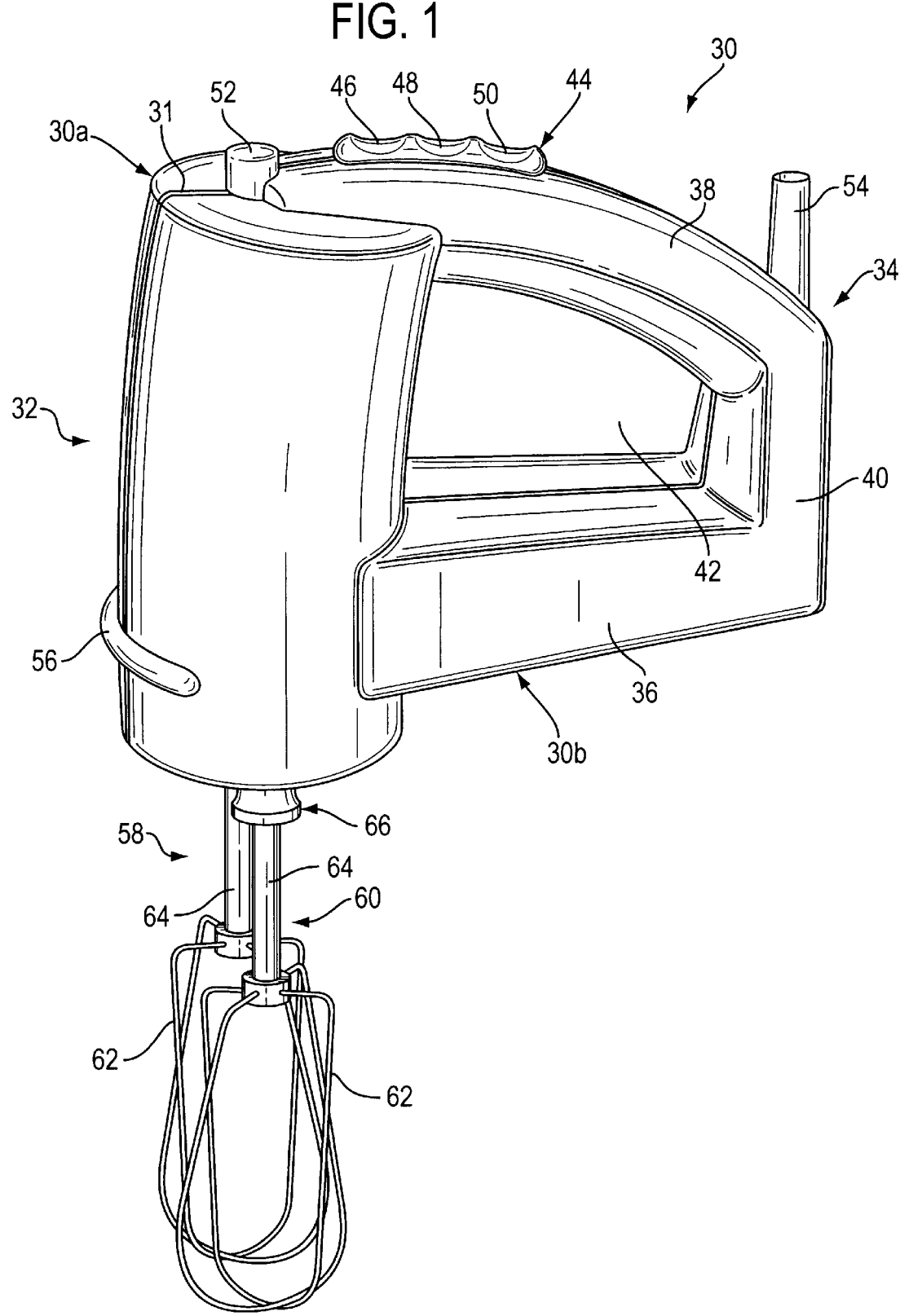
FIG. 1 is a perspective view showing a hand mixer in accordance with certain principles of the invention.

Referring to FIG. 1, an electric hand mixer 30 includes two half-shell sections 30a and 30b which are joined along a seam 31 (FIG. 2) to form a housing 32 and a handle 34 extending away from the housing. The housing 32 and the handle 34 are hollow internally and, when assembled, form a hollow shell. The handle 34 is formed with a lower section 36 and an upper section 38, each of which are joined with the housing 32 at one end thereof, and a rear section 40 which joins with opposite ends of the lower and upper sections of the handle. The lower section 36 and the upper section 38 are spaced from each other and, with the housing 32 and the rear section 40, frame an opening 42 through which a hand (not shown) of a user will be located during use of the hand mixer 30.

Figure 2:
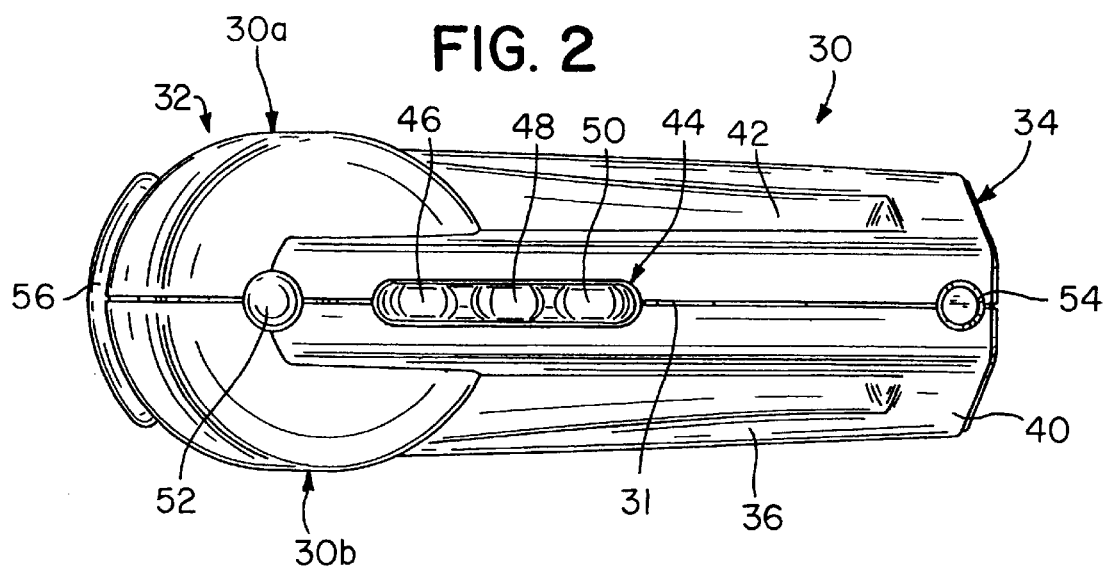
FIG. 2 is a top view of the hand mixer of FIG. 1.

As shown in FIGS. 1 and 2, the hand mixer 30 further includes a compliant switch pad 44 having thumb-engaging scallops 46, 48 and 50 formed on the top thereof, a beater ejector button 52 just forward of the switch pad, an electrical cord support 54 and a compliant front bumper 56. As further shown in FIG. 1, a pair of food stuff beaters 58 and 60 are shown in assembly with the hand mixer 30, each of which is formed with a beater element 62, a linking shaft 64 and a mounting member 66.

Figure 15:
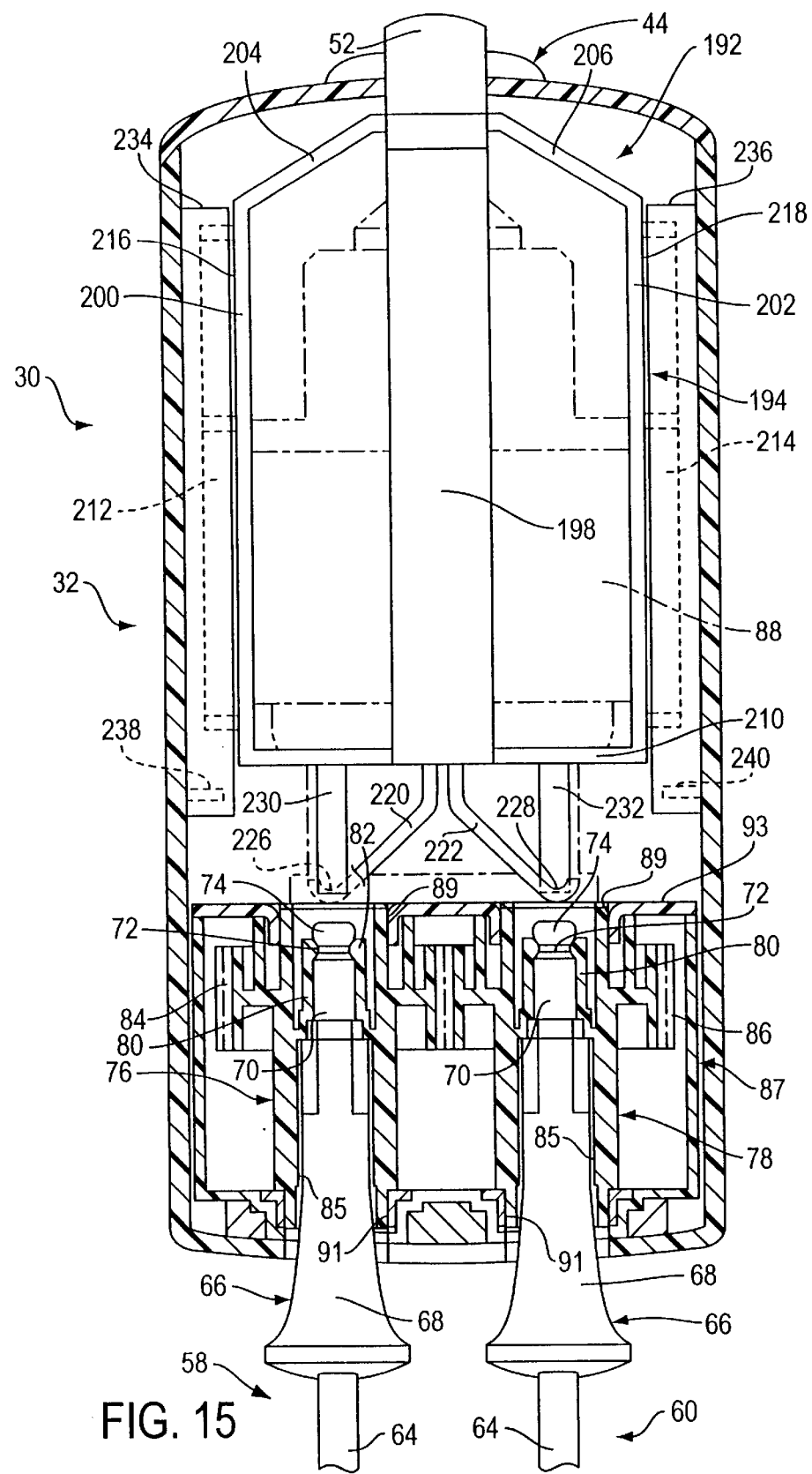
FIG. 15 is a partial front sectional view of a first embodiment of a beater ejection mechanism located with a housing of the mixer of FIG. 1 in accordance with certain principles of the invention.
Figure 16:
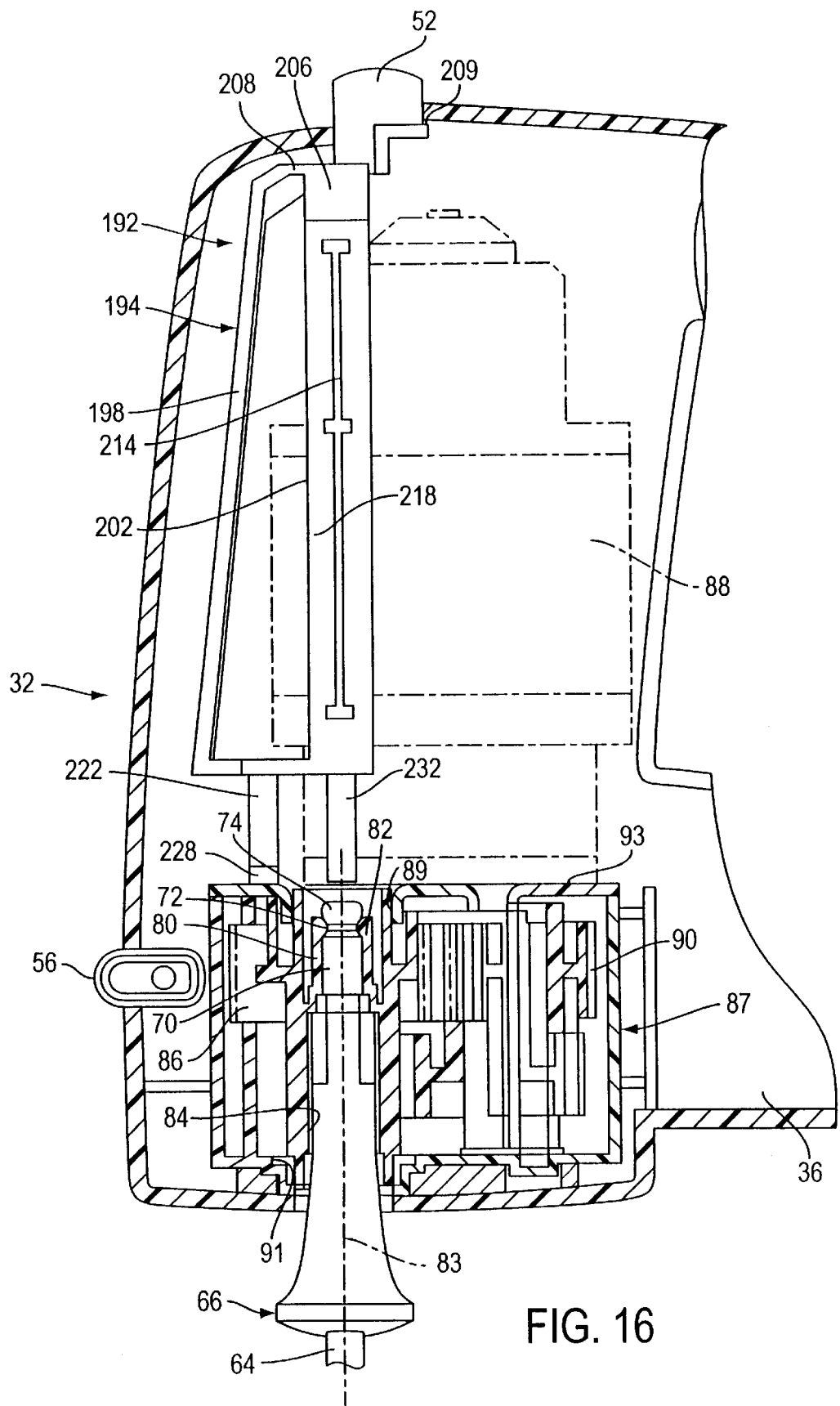
FIG. 16 is a partial side sectional view of the first embodiment of the beater ejection mechanism of FIG. 15 within the housing in accordance with certain principles of the invention.

Referring to FIGS. 15 and 16, the mounting members 66 are each composed of a plastic material with a flared section 68 which extends axially from a juncture with the shaft 64 to a top end of the section. Each mounting member 66 is further formed with a stem 70 which extends axially from the top of the flared section 68 to an annular groove 72 near the top of the mounting member, with a bulbous end 74 formed at the top of the mounting member to define the upper boundary of the annular groove.

A pair of mounting-member receptors 76 and 78 are located within the housing 32 and each of the receptors include a plurality of spaced axially-extending biased fingers 80 formed with nubs 82 which extend radially inward toward a central axis 83 (FIG. 16) about which the fingers are symmetrically located. As the mounting members 66 are inserted into respective openings 85 of the hand mixer 30, the bulbous ends 74 move the nubs 82 laterally outward from the axis of the fingers 80. Eventually, the nubs 82 clear the bulbous ends 74, whereafter the nubs snap into the annular grooves 72 to facilitate retention of the beaters 58 and 60 within the housing 32.

Figure 23:
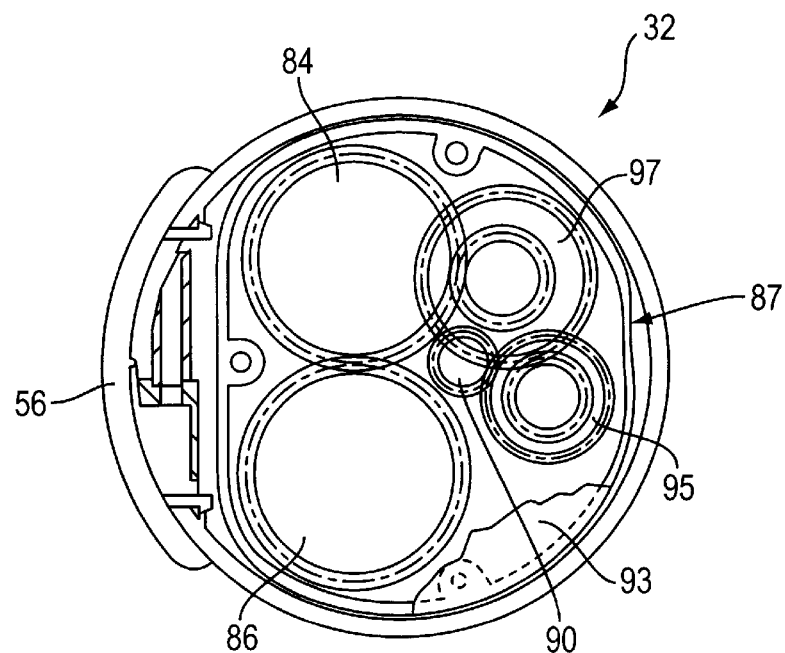
FIG. 23 is top view of a gear housing within the mixer housing of FIG. 15 showing a gearing arrangement for coupling operating energy from a motor within the mixer housing to food processing beaters attached to the hand mixer.

The receptors 76 and 78 are also formed with meshed gears 84 and 86 (FIG. 23), respectively, which are concentric about the axis of the biased fingers 80 and the mounting members 66. The receptors 76 and 78, the biased fingers 80 and the gears 84 and 86 are enclosed within a gear housing 87 (FIG. 23) which is formed with top openings 89, bottom openings 91 and a cover 93(FIG. 23). A motor 88, shown in phantom in FIGS. 15 and 16, and as shown in solid in FIG. 24, drives a motor pinion 90 (FIG. 23) which facilitates the driving of a pair of idler gears 95 and 97 (FIG. 23) which, in turn, facilitates the driving of the gears 84 and 86 to rotate the beaters 58 and 60, respectively.

Referring to FIG. 3, half-shell section 30a has been removed to reveal a sensory actuator 92 which is mounted within a shell opening 94 of the handle 34 defined by the assembled half-shell sections 30a and 30b of FIGS. 1 and 2. A circuit card 96 is mounted within the shell opening 94 and provides a focal location for an electrical circuit of the hand mixer 30 for supplying operating electrical energy for the motor 88, and through the sensory actuator 92 for controlling the enabling, disabling and speed control of the motor.

A slide resistance element 98, such as a potentiometer, is encased in a container 100 which is mounted on the circuit card 96 and is electrically connected to the motor 88 to adjust the electrical energy supplied to the motor to thereby adjust the speed of the motor. The resistance element 98 includes a movable tab 102 which is attached to a resistance-adjusting slide (not shown) within the container 100 with a portion of the tab extending outward from the container as shown in FIG. 3. The tab 102 is movable from a first end position as shown in FIG. 3, representing that the motor 88 is disabled, to a second end position as shown in FIG. 5, representing that the motor is operating at maximum speed. Selected positions between the first and second end positions of the tab 102 provide for operating the motor 88 at selected different speeds.

Figure 13:
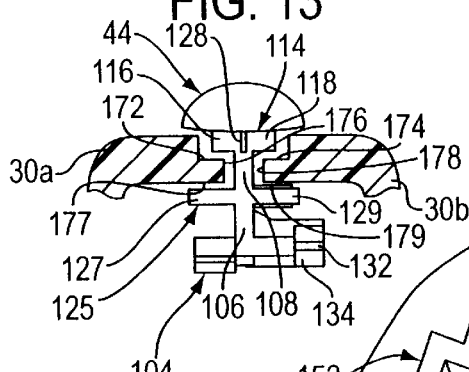
FIG. 13 is an end view showing the sensory actuator of FIG. 3 in assembly with the handle in accordance with certain principles of the invention.
Figure 14:
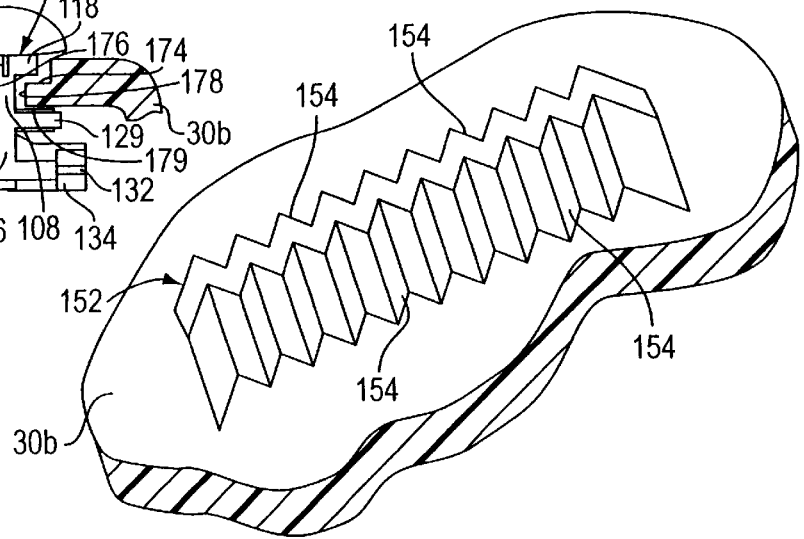
FIG. 14 is a partial perspective view of a ratchet fence of the switch sensory mechanism of FIG. 3 formed on an inner wall of the handle in accordance with certain principles of the invention.

Referring now to FIGS. 8 and 9, a movable carrier 104 of the sensory actuator 92 is composed of plastic as a single piece and is formed with a central body 106. A pair of spaced columns 108 and 110 extend upward from the body 106 and form a window 112 therebetween. A guide bar 114 (FIG. 8) is joined to the tops of the columns 108 and 110 and is formed with side sections 116 and 118 which extend laterally from the column 108 as shown in FIG. 13. A pad support 120 is formed on the top of the guide bar 114 with three scallops 122, 124 and 126 formed on the top of the pad support in a manner identical to the scallops 46, 48 and 50, respectively, of the switch pad 44 (FIGS. 1 and 2). The compliant switch pad 44 is eventually assembled on, and secured to, the top of the pad support 120 to provide the switch pad in an exterior location of the hand mixer 30 for easy access by the user of the mixer. It is noted that the pad support 120 can be scallopless on the top and support the scalloped compliant switch pad 44 thereon without departing from the spirit and scope of the invention.

A guide plate 125 is formed at the bottom edge of the window 112 and includes a pair of guide wings 127 and 129 which extend laterally on opposite sides of the window as shown in FIGS. 9 and 13. A forward guide blade 128 and a rear guide blade 130 extend downward from an underside of the pad support 120 along a vertical plane located between opposite ends of the pad support and centrally between opposite sides of the pad support.

A first cantilever beam 132, shown also in FIG. 11, extends in a forward direction from a lower portion of the central body 106 and is formed with a pawl or sensory element 134 near the free end thereof which extends from the top and bottom of the beam. A second cantilever beam 136 extends in a rearward direction from the rear of the central body 106 and is formed with a sensory button 138 on the top of the beam near the free end thereof. A cantilever platform 140, which is also shown in FIG. 10, extends in a rearward direction from a rear underside portion of the central body 106 and is formed with a wide slot 142 along one edge thereof for receipt of the tab 102 of the slide resistance element 98. The platform 140 is formed with strengthening ribs 144 and 146 which are located adjacent the slot 142 to strengthen the platform, particularly in the vicinity of the slot. Further, the platform 140 is formed with a cam surface 148 on a ramped wall 150 of the platform as shown in FIG. 8.

As shown in FIGS. 3, 4, 5 and 14, a ratchet fence 152 is formed on the interior wall of the half-shell section 30b and is configured in a zig-zag fashion to form a series of "V" shaped notches 154 on each side of the fence. As shown in FIGS. 3 through 7, a knob 156 is formed on the interior wall of the half-shell section 30b and is located in the path of the sensory button 138 formed on the cantilever beam 136. As shown in FIGS. 6 and 7, the half-shell section 30b has been partially removed to reveal the opposite side of the sensory actuator 92. The sensory actuator 92 further includes an "on/off" switch unit 158 which is mounted on the circuit card 96 and includes a spring-biased switch plunger 160 which is in the path of the cam surface 148 of the cantilever platform 140.

Figure 12:
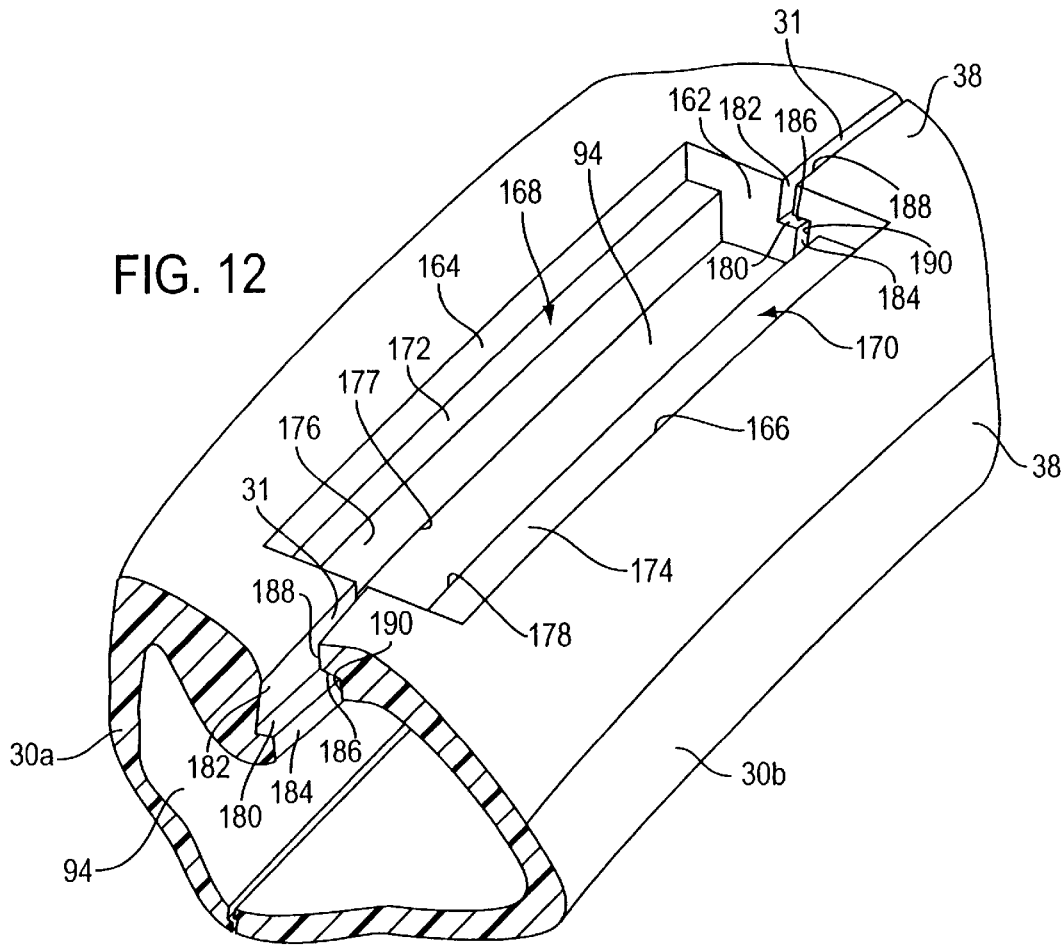
FIG. 12 is a perspective view of a portion of a shell of the handle in the section thereof where the sensory actuator is to be located in accordance with certain principles of the invention.

As shown in FIG. 12, the portion of the upper section 38 of the handle 34, on which the movable carrier 104 is mounted, is formed with a passageway 162 which extends through the thickness of the half-shell sections 30a and 30b into the shell opening 94 of the upper section. The passageway 162 is formed in a longitudinal direction in line with the seam 31 and interrupts the seam as illustrated. The passageway 162 is formed with spaced opposed upper risers 164 and 166, of a prescribed upper-riser height, and with identical steps 168 and 170, respectively, extending toward each other from the respective upper risers. The steps 168 and 170 are formed with shoulder surfaces 172 and 174, respectively, and lower risers 176 and 178, respectively, of a prescribed lower-riser height, and undersurfaces 177 and 179 (FIG. 13), respectively.

At least in the vicinity of the passageway 162, the half-shell section 30a is formed with a stepped shoulder 180 which is contiguous with upper and lower risers 182 and 184, with the depth of the shoulder between the upper and lower risers being a prescribed distance. The half-shell section 30b is formed with an inverted stepped shoulder 186 which is contiguous with upper and lower risers 188 and 190, with the depth of the shoulder between the upper and lower risers being less than the prescribed distance by a prescribed amount. When the half-shell sections 30a and 30b are assembled, the lower riser 184 of section 30a engages the lower riser 190 of the section 30b. Since the depth of the shoulder 180 of the section 30a is greater than the depth of the shoulder 186 by the prescribed amount, the upper risers 182 and 188 are spaced apart by the prescribed amount, which defines the width of the seam 31.

Referring again to FIG. 3, when the movable carrier 104 is to be assembled with the hand mixer 30, the half-shell sections 30a and 30b are separated and the carrier is manipulated into the position illustrated. During the positioning of the movable carrier 104, the forward blade 128 and the rear blade 130 are located against the edge of section 30b which forms one side wall of the seam 31. In addition, the sensory button 138 on the second cantilever beam 136 is located just to the rear of the knob 156. Further, the cantilever beam 132 is located so that the pawl element 134 is located at the rear end of the ratchet fence 152 in engagement with a half portion of the end notch 154. Also, the tab 102 of the slide resistance element 98 is located within the slot 142 (FIG. 10), and the plunger 160 of switch 158 is located adjacent, and in the path of, the cam surface 148.

Referring to FIG. 13, the prescribed lower-riser height of the spaced lower risers 176 and 178 is slightly less than the space between the underside of the side sections 116 and 118 of the guide bar 114 and the upper surfaces of the guide wings 127 and 129 of the guide plate 125, respectively. With this dimensioning, the step 170 fits loosely into the space between the side section 118 and the guide wing 129 and, upon assembly of the half-shell section 30a with section 30b, the step 168 fits loosely into the space between the side section 116 and the guide wing 127. The sections 116 and 118 of the guide bar 114 are now resting on the shoulder surfaces 172 and 174. In addition, the height of the guide bar 114 is greater than the prescribed upper-riser height of the upper risers 164 and 166, which maintains the pad support 120 above the surface of, and spaced from, the exterior of the handle 34. This spacing precludes any frictional rubbing between the pad support 120 and the exterior surface of the handle 34 during movement of the movable carrier 104 relative to the handle.

After the half-shell sections 30a and 30b have been assembled and the hand mixer 30 is ready for use, an operator of the mixer places a given one of the operator's hands through the handle opening 42 and places the thumb of the given hand in the most comfortable one of the scallops 46, 48 or 50 on the compliant switch pad 44. The scallops 46, 48 and 50 have been located to accommodate thumbs of different lengths, and/or comfort extension thereof, to provide for comfortable usage by different operators. While the thumb would appear to be the most logical digit to use for moving the carrier 104, some operators may choose to use other digits of the hand. The advantageous location of the scallops 46, 48 and 50 could apply to the use of other digits of the hand in addition to the thumb.

With the thumb placed in the appropriate scallop 46, 48 of 50, the operator urges the movable carrier 104 forward, that is, toward the beater ejector button 52 as shown in FIGS. 1 and 2. Initially, the operator must apply sufficient force to the movable carrier 104 to move the sensory button 138 from the position illustrated in FIG. 3, that is, from the left side of the knob 156 (FIG. 6), to a position on the right side of the knob (FIG. 7). During this movement of the movable carrier 104, the cantilever platform 140 moves in the forward direction whereby the cam surface 148 engages and depresses the plunger 160 (FIG. 6). Thereafter, the undersurface 149 of the cantilever platform 140 maintains the plunger 160 depressed as the platform continues to move forward, or is stopped in a forward position. As the plunger 160 is depressed, the switch 158 is turned on to facilitate the application of operating energy to the motor 88 and eventual rotation of the beaters 58 and 60. In order to move the sensory button 138 past the nob 156, extra force must be applied by the operator to the movable carrier 104 to overcome the impediment of the nob in the path of the button. When the extra force is applied and the button 138 passes the nob 156, a tactile reaction is sensed by the operator. This tactile reaction, through use of the sensory feature of the button 138 in overcoming the impediment of the nob 156, is an indication to the operator of the closing of the switch 158 and the initiation of the operation of the hand mixer 30.

As the movable carrier 104 continues to be moved by the operator, the cantilever platform 140 moves the tab 102 of the slide resistance element 98 to progressively increase the level of operational energy being applied to the motor 88. During this period, the pawl element 134 is engaging, and moving in and out of, successive ones of the notches 154 of the ratchet fence 152. As the pawl element 134 drops into one notch 154, the operator must apply extra force to urge the pawl element to move from the one notch to the next notch. This movement of the movable carrier 104 provides an increase in the energy applied to the motor 88 and results in increased speed of the motor and, consequently, the beaters 58 and 60. In order to move the pawl element 134 out of each successive notch 154, extra force must be applied by the operator to the movable carrier 104 to overcome the impediment of the notch in the path of the pawl element. When the extra force is applied and the pawl element 134 moves from one notch 134 to the next notch, a tactile reaction is sensed by the operator. This tactile reaction, through use of the sensory feature of the pawl element 134 in overcoming the impediment of the notches 154, is an indication to the operator that the speed of the motor 88, and the beaters 58 and 60, is being incrementally increased.

As shown in FIG. 4, the pawl element 134 and the tab 102 of the slide resistance element 98 have been moved to an intermediate position. Referring to FIG. 5, with continued forward movement of the movable carrier 104, the pawl element 134 and the tab 102 eventually reach a "maximum speed" position where the motor 88, and the beaters 58 and 60 are operating at the maximum speed.

It is noted that the word "off" and numerals "1" through "5" are spaced and displayed on the top of the handle 34, above the housing 32 and between compliant switch pad 44 and the beater ejection button 52. These characters provide a general indication to the operator regarding the operating state of the beaters 58 and 60 and the speed of such operation.

Referring to FIGS. 4 through 7, as the movable carrier 104 is being moved as described above, the guide blades 128 and 130 move along the seam 31 and prevent the forward and rear portions of the pad support 120 from moving laterally. Further, referring to FIGS. 12 and 13, the side sections 116 and 118 of the guide bar 114 and the wings 127 and 129 of the guide plate 125 cooperate with the steps 168 and 170 of the half-shell sections 30a and 30b allowing the movable carrier 104 to glide smoothly along the passageway 162, but preventing movement of the carrier into, or away from, the shell opening 94 of the handle 34.

When the operator wishes to reduce the speed of the beaters 58 and 60, the movable carrier 104 is moved rearward whereby the pawl element 134 moves in and out of the notches 154 just as it did in the forward movement of the carrier. Again, this provides a tactile response to the operator as an indication of incremental decrease of the motor and beaters speed. Further, when the operator wishes to cease operation of the hand mixer 30, the movable carrier 104 is moved to a rearward position where the sensory button 138 assumes the position shown in FIG. 7 adjacent the knob 156. The operator must then exert an additional force on the movable carrier 104 to overcome the blocking impediment of the knob 156 and thereby urge the sensory button past the knob to the position illustrated in FIG. 6. As this occurs, the undersurface 149 and the cam surface 148 of the cantilever platform 140 move away from the spring-biased plunger 160 to open the switch 158 whereby the operating energy is removed from the motor 88 and the beaters 58 and 60 cease to rotate. As the shutdown procedure is occurring, the operator senses the tactile response of the sensory button 138 moving over the knob 156 to provide indication that the switch 158 has been turned off.

Referring to FIGS. 15 through 18, a first embodiment of a beater ejector mechanism 192 is formed with a skeleton frame 194 and is composed of a plastic material, essentially as one piece, and is used to provide a hard ejection of the beaters 58 and 60 from assembly with the hand mixer 30. The beater eject button 52 is formed with, and is located at the top of, the frame 194 and protrudes from the top of the housing 32 as illustrated particularly in FIGS. 15 and 16. The button 52 is covered with a comfortable compliant cover 196 (FIG. 18) composed of the same material, and of the same color as, the compliant switch pad 44 (FIG. 1). The cover 196 is not formed as a component of the onepiece structure of the beater ejector mechanism 192, but is closely associated with the button 52 by virtue of its assembly therewith.

As shown in FIGS. 17 and 18, the skeleton frame 194 is formed with a central strut 198 spaced from two side struts 200 and 202 which are spaced from and parallel with each other. The side struts 200 and 202 are joined at the top thereof by two respective linking angled struts 204 and 206 (FIG. 17), and with the button 52 by an upper web 208 which is also formed with a bottom portion of the button. A ledge 209 (FIGS. 16 and 18) is formed with the bottom of the button 52 and extends rearward therefrom for a short distance. The bottom of the central strut 198 is joined with the bottoms of the side struts 200 and 202 by a lower web or floor 210. The struts 200 and 202 are formed with essentially the same width while the width of the central strut 198 is slightly wider. The widest portion of each of the spaced and parallel side struts 200 and 202 faces the widest portion of the other side strut, while the widest portion of the central strut 198 is turned essentially ninety degrees from the side struts and tapers outward from top to bottom thereof as shown in FIG. 18.

Figure 24:
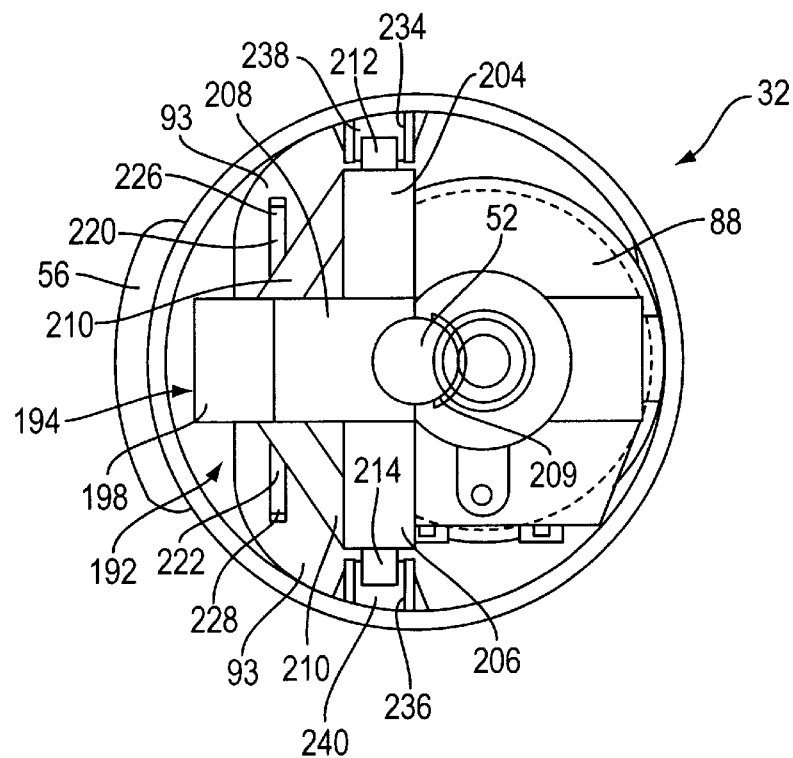
FIG. 24 is a top view of the mixer housing of FIG. 1 with a top portion removed to reveal common portions of the first and second embodiments of the beater ejection mechanism of FIGS. 15 through 22 in accordance with certain principles of the invention.

A pair of rails 212 and 214 are formed on respective outboard surfaces 216 and 218 of the side struts 200 and 202, respectively, and extend outwardly from the respective outboard surfaces for nearly the entire length of the side struts. A pair of resilient legs 220 and 222 are formed with and extend downward from an undersurface 224 of the floor 210, and are formed with rounded feet 226 and 228, respectively. A pair of spaced, parallel ejection rods 230 and 232 also extend downward from undersurface 210. As shown in FIGS. 15 and 24, the interior wall of the housing 32 is formed with a pair of spaced, opposed channels 234 and 236 having respective lower limit ledges 238 and 240, respectively.

Referring to FIGS. 15 and 16, the beater ejection mechanism 192 is assembled within the housing 32 with the resilient legs 220 and 222 in a normal unbiased state and the rounded feet 226 and 228, respectively, resting on the cover 93. The rails 212 and 214 are located within the respective channels 234 and 236, and the button 52, with the compliant cover 196 (FIG. 18), extending axially outside of the housing 32 at the top thereof.

As noted above, the beaters 58 and 60 are assembled with the hand mixer 30 by inserting the mounting member 66 of each beater into the respective openings 85 until the nubs 82 of the fingers 80 are seated in the annular grooves 72 of the mounting members. When the beaters 58 and 60 are to be removed from the hand mixer 30 by use of the first embodiment of the beater ejection mechanism 192, the operator depresses the button 52 whereupon the skeleton frame 194 moves downward as viewed in FIGS. 15 and 16 whereby the resilient legs 220 and 222 are being biased between the skeleton frame and the cover 93. Eventually, the ejection rods 230 and 232 engage, in a hard interface, the upper surfaces of the bulbous ends 74 of the respective beaters 58 and 60 whereafter continued downward depression of the button 52 pushes the beaters axially downward, as viewed in FIG. 15.

Due to the hard interfacing engagement between the rounded lower surfaces of the bulbous ends 74, and the corresponding surfaces of the nubs 82, the fingers 80 are gradually cammed out of the annular grooves 72 to allow the beaters 58 and 60 to be manually removed from the hand mixer 30, or to fall freely from the hand mixer if the housing 32 is held in such a position that would allow such free fall. When the bulbous ends 74 of the beaters 58 and 60 have been moved past the nubs 82, the button 52 can be released and the biased resilient legs 220 and 222 facilitate the return of the skeleton frame 194 to the position illustrated in FIG. 15.

Referring to FIG. 15, a lower end of each of the rails 212 and 214 will engage the lower limit ledges 238 and 240, respectively, to establish the lower limit to which the skeleton frame 194, and the ejection rods 230 and 232 can travel.

Referring to FIGS. 19, 20, 21 and 22, a second embodiment of a beater ejection mechanism 242, which is the preferred embodiment, is nearly identical to the first embodiment of the beater ejection mechanism 192. The elements of the beater ejection mechanism 242 which are common to the beater ejection mechanism 192 will use the same numerals as used when describing mechanism 192 above. Further, where the structure and functioning of the common elements are essentially identical, the description thereof will not be repeated but will rely on the description above.

Figure 19:
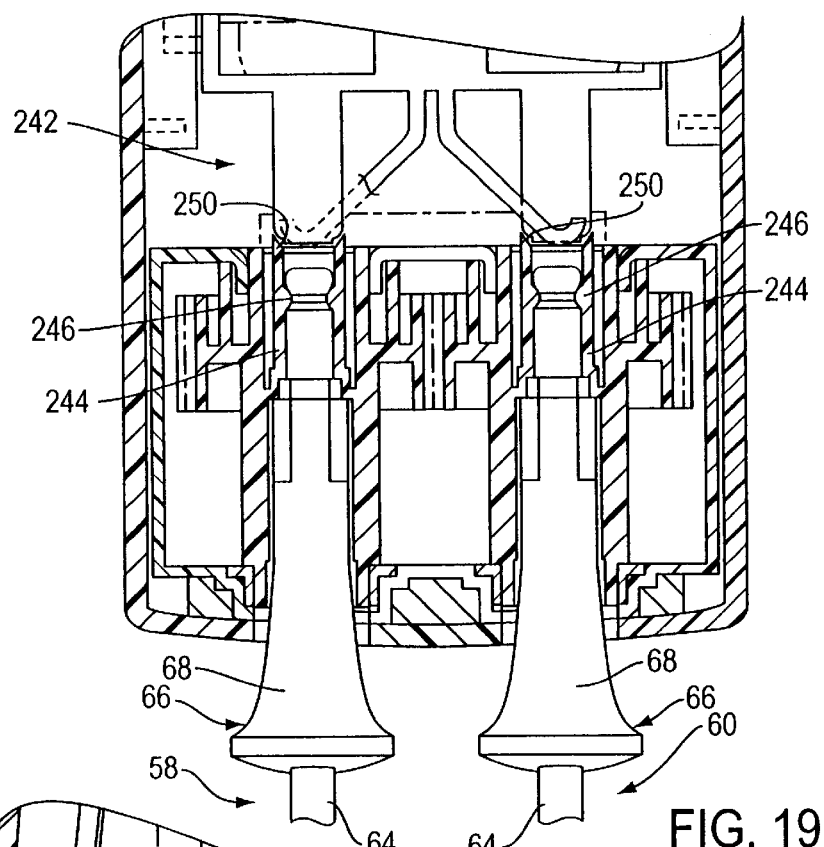
FIG. 19 is a partial front sectional view of a second embodiment of a beater ejection mechanism located with a housing of the mixer of FIG. 1 in accordance with certain principles of the invention.
Figure 20:
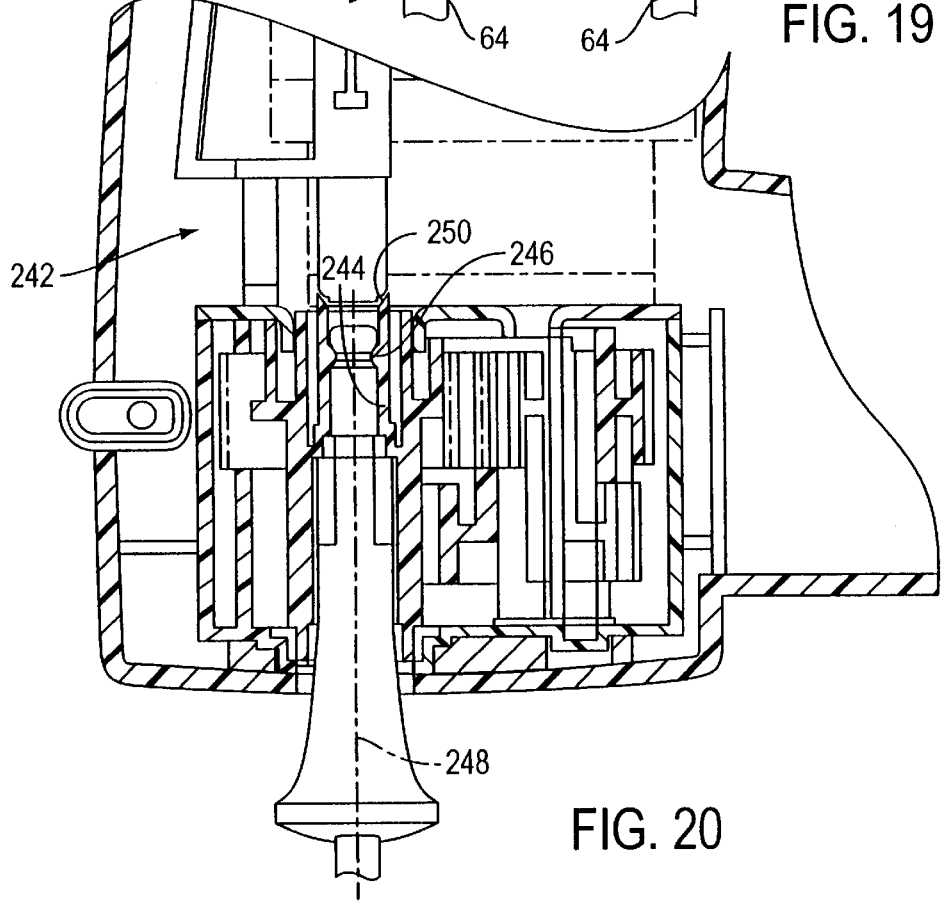
FIG. 20 is a partial side sectional view of the second embodiment of the beater ejection mechanism of FIG. 19 within the housing in accordance with certain principles of the invention.

As shown in FIGS. 19 and 20, the pair of mounting-member receptors 76 and 78 are located within the housing 32 and each of the receptors include a plurality of spaced axially-extending biased fingers 244 formed with nubs 246 which extend radially inward toward a central axis 248 (FIG. 20) about which the fingers are symmetrically located. In the preferred embodiment of the beater ejection mechanism 242, the nubs 246 are formed laterally inward from an intermediate section of the biased fingers 244. The fingers 244 extend upwardly in FIGS. 19 and 20 from the section with the nubs 246 to respective free ends of the fingers. Each of the free ends of the fingers 244 is formed with a bevelled surface 250 which slopes downward and axially inward as shown in FIGS. 19 and 20.

As the mounting members 66 are inserted into respective openings 84 of the hand mixer 30, the bulbous ends 74 move the nubs 246 laterally outward from the axis of the fingers 80. Eventually, the bulbous ends 74 clear the nubs 246, whereafter the nubs snap into the annular grooves 72 to facilitate retention of the beaters 58 and 60 within the housing 32. In this assembly, the bevelled surfaces 250 of the free ends of the fingers 244 are located axially above the bulbous ends 74 and extend slightly above and beyond the cover 93 as shown in FIGS. 19 and 20. Also, the nubs 246 are spaced axially from the bevelled surfaces 250 by a prescribed axial distance.

Figure 22:
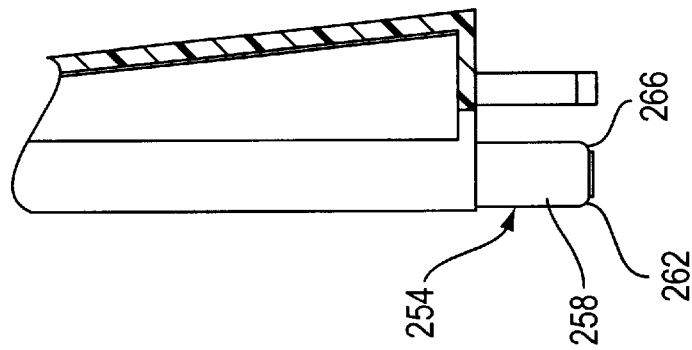
FIG. 22 is a partial sectional view showing a side of the second embodiment of the beater ejection mechanism of FIG. 19 in accordance with certain principles of the invention.
Figure 25:
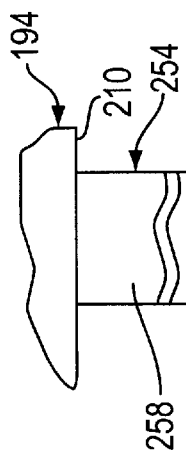
FIG. 25 is a partial view showing the structure of a beater ejection rod in accordance with certain principles of the invention.
Figure 21:
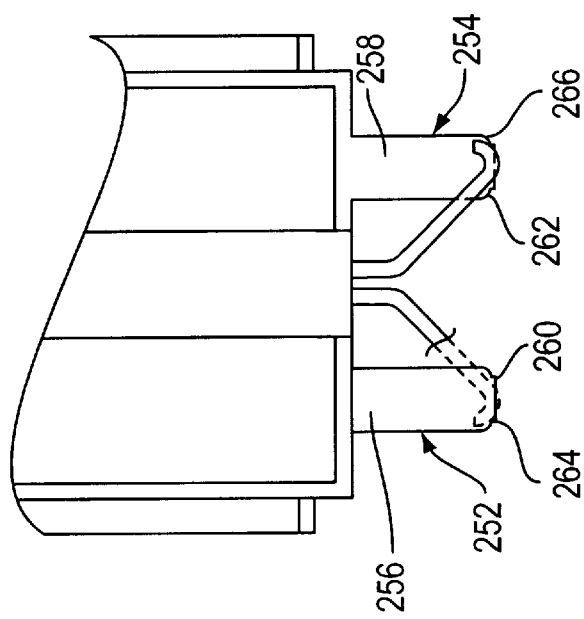
FIG. 21 is a partial front view of the second embodiment of the beater ejection mechanism of FIG. 19 in accordance with certain principles of the invention.

Referring to FIGS. 21 and 22, a pair of spaced, parallel ejection rods 252 and 254 (FIG. 25) extend downward from undersurface 210 of the skeleton frame 194. The ejection rods 252 and 254 are formed with upper sections 256 and 258 (FIG. 25), respectively, at a prescribed axial length and a prescribed diameter, and lower sections 260 and 262 (FIG. 25), respectively, at an axial length much less than the prescribed axial length and at a diameter less than the prescribed diameter. The juncture between the upper sections 256 and 258 and the lower sections 260 and 262, respectively, are formed with convex radius surfaces 264 and 266, respectively, which extend circumferentially around the respective rods 252 and 254. Also, the axial length of each of the lower sections 260 and 262 are less than the prescribed axial length between the nubs 246 and the bevelled surfaces 250 of the fingers 244.

When the beaters 58 and 60 are to be removed from the hand mixer 30 by use of the second, and preferred, embodiment of the beater ejection mechanism 242, the operator depresses the button 52 to move the skeleton frame 194 downward as viewed in FIGS. 19 and 20. Upon downward movement of the skeleton frame 194, the resilient fingers 220 and 222 are biased in the same manner as described above with respect to the use of the first embodiment of the beater ejection mechanism 192.

Upon continued downward movement of the skeleton frame 194, the lower sections 260 and 262 are moved into an axial space having a perimeter defined by the bevelled surfaces 250 of the fingers 244 but do not engage the surfaces. Eventually, the convex radius surfaces 264 and 266 of the ejection rods 252 and 254, respectively, engage the bevelled surfaces 250 of the fingers 244 and urge the fingers radially outward from the axis 248 (FIG. 20).

As the fingers 244 are urged softly and radially outward, the nubs 246 move radially outward from the respective annular grooves 72 of the beaters 58 and 60 to softly withdraw the nubs from holding the beaters with the hand mixer 30. The beaters 58 and 60 can now be removed by hand from assembly with the hand mixer 30, or may fall freely from the hand mixer if the housing 32 is held in such a position that would allow such free fall. Further, if the beaters 58 and 60 remain within the hand mixer 30 after the spreading of the fingers 244 and radial withdrawal of the nubs 246, the operator can continue depressing the button 52 and the lower sections 260 and 262 of the rods 252 and 254, respectively, will engage the tops of the bulbous ends 74. This action will eject the beaters or allow the beaters to be removed by hand.

As noted above, the axial height of the lower sections 260 and 262 of the respective rods 252 and 254 is less than the prescribed axial distance between the nubs 246 and the bevelled surfaces 250 of the fingers 244. This structure allows the respective convex radius surfaces 264 and 266 to engage the bevelled surfaces 250 well before the lower sections 260 and 262 of the respective rods 252 and 254 engage the tops of the bulbous ends 74. Thus, the fingers 244 will be spread apart by the soft action between the convex radius surfaces 264 and 266, and the bevelled surfaces 250, well before any engagement between the lower sections 260 and 262, and the bulbous ends 74, to thereby allow for the soft ejection of the beaters 58 and 60.

The foregoing description has been made with reference to the vertical orientation of the hand mixer 30 as illustrated in the drawings. It is to be understood that the hand mixer 30 can be operated while being held in a variety of orientations, in addition to the vertical orientation of the drawings, without departing from the spirit and scope of the invention.

An operator of the hand mixer 30, which uses the sensory features associated with the sensory actuator 92, is provided with tactile responses which enhance the operator's ability to control the operation of the hand mixer and to obtain enhanced results in the food product being prepared. Further, once the operator completes the food preparation effort, the first and preferred second embodiments of the beater ejection mechanisms 192 and 242 facilitate easy and fast disassembly of the beaters 58 and 60 from the hand mixer 30.

In general, the above-identified embodiments are not to be construed as limiting the breadth of the present invention. Modifications, and other alternative constructions, will be apparent which are within the spirit and scope of the invention as defined in the appended claims.

What is claimed is:

1. An electric mixer, which comprises:

a housing;

a handle formed with and extending from the housing for handling of the electric mixer by an operator;

the housing and handle forming a hollow shell therewithin;

a beater holder mounted in the hollow shell for supporting at least one beater implement;

a motor contained within the hollow shell for rotating the beater holder;

an adjustable speed control assembly mounted within the hollow shell for selectively controlling the speed of operation of the motor and thereby the rotational speed of the beater holder;

a tactile control mechanism located within the hollow shell and spaced from said adjustable speed control assembly to provide tactile response to the operator of the selective operation and speed control of the mixer during any mixing and beating operation, said tactile control mechanism comprising a switch pad mounted movably on an exterior portion of the handle, the switch pad requiring a prescribed level of force by the operator for movement thereof, a carrier mechanically coupled to the switch pad for movement therewith, said carrier moving in a substantially linear horizontal plane within the hollow shell, said carrier mounting first and second sensory buttons thereon, a single knob formed within the hollow shell in a fixed position in the path of movement of the first sensory button to provide a motor ON/OFF operator indication to the user of the mixer; and a plurality of successively aligned notches formed within the hollow shell and spaced from the adjustable speed control assembly in a fixed position in the path of movement of the second sensory button.

2. The electric mixer as set forth in claim 1 wherein the first sensory button is located on a cantilever beam to provide a resilient mount for the button.

3. The electric mixer as set for in claim 2 wherein the second sensory button is located on a cantilever beam to provide a resilient mount for the button.

4. The electric mixer as set for in claim 1 wherein the second sensory button is located on a cantilever beam to provide a resilient mount for the button.

* * * * *